Figure 4:
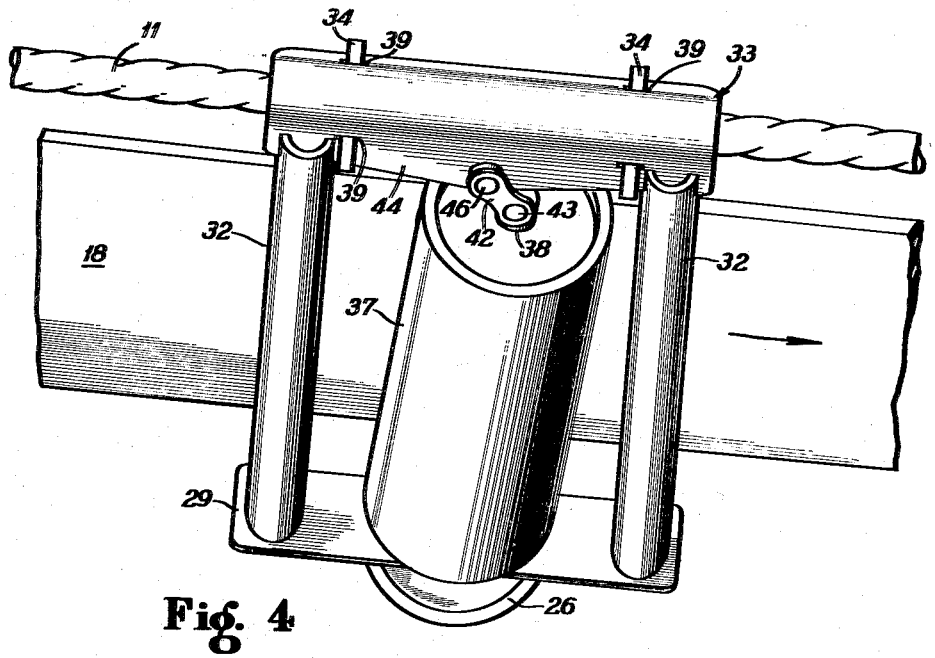

July 23, 1963  K. McCANN  3,098,557
TROUGHING ROLLER ASSEMBLY AND BELT CONVEYOR
Original Filed Dec. 23, 1957  2 Sheets-Sheet 1
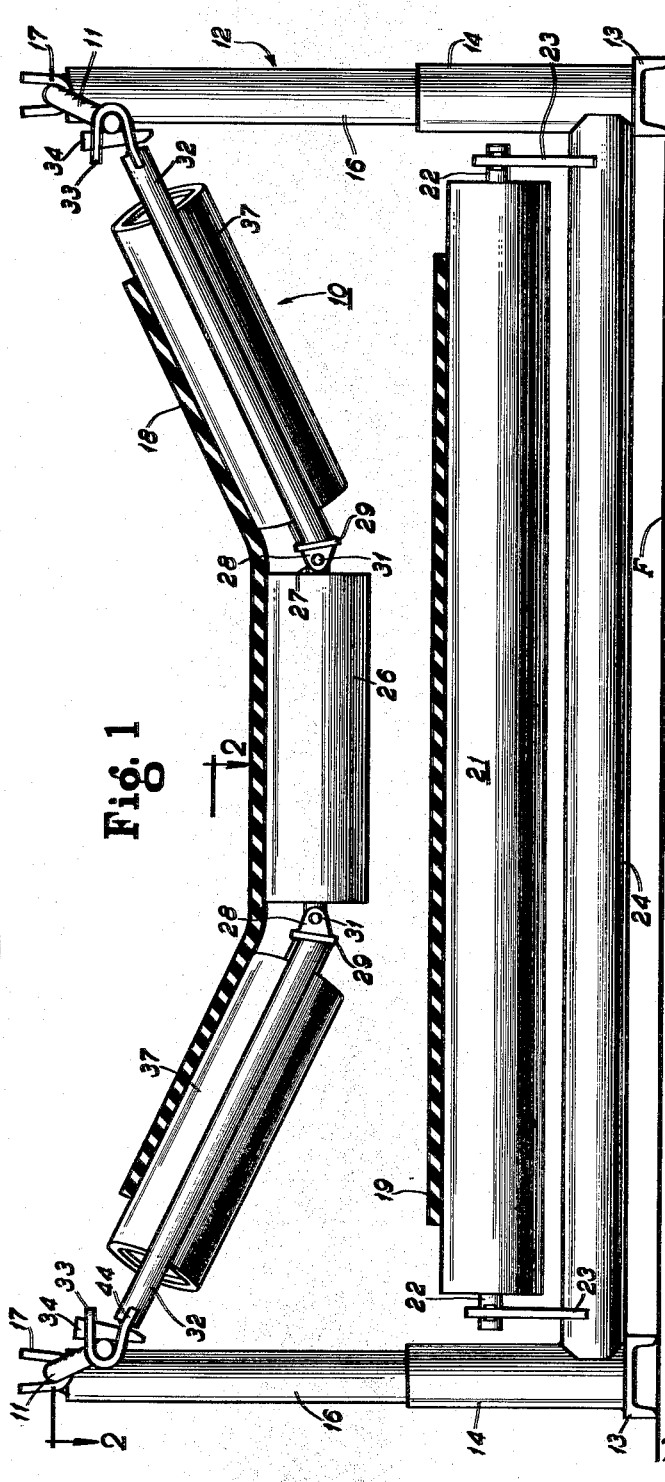
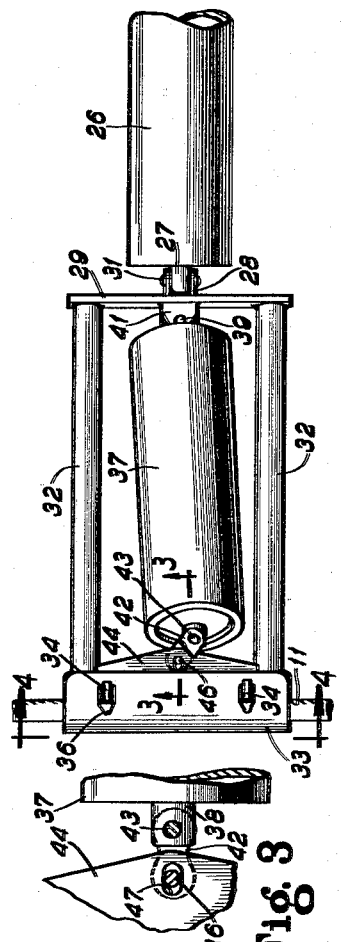
INVENTOR.
Keith McCann
BY
Murray A. Gleeson
ATTORNEY July 23, 1963 K. McCANN 3,098,557
TROUGHING ROLLER ASSEMBLY AND BELT CONVEYOR
Original Filed Dec. 23, 1957 2 Sheets—Sheet 2

INVENTOR.
Keith McCann
BY
Murray A. Gleeson
ATTORNEY

United States Patent Office 3,098,557
Patented July 23, 1963

3,098,557
TROUGHING ROLLER ASSEMBLY AND
BELT CONVEYOR
Keith McCann, Taylorville, Ill., assignor to Goodman Manufacturing Company, Chicago, Ill., a corporation of Illinois
Continuation of abandoned application Ser. No. 704,483, Dec. 23, 1957. This application July 13, 1959, Ser. No. 827,417
3 Claims. (Cl. 198—192)

This invention relates generally to a troughing roller assembly for belt conveyors, and particularly to improvements whereby any detraining effect of the conveying reach is minimized.

In belt conveyors of the type where the load on the conveying reach is transferred by means of troughing roller assemblies into laterally spaced support strands or ropes trained along a conveying course, the direction of movement of the conveying reach is such as to tend to swing the troughing roller assembly in the direction of the conveying reach. In cases where the belt is operating downhill, the pendulum effect of the troughing roller assembly, which has its rollers freely articulately connected for movement in a vertical plane, causes the outer wing rollers to have their inner ends swung or canted in the downhill direction. This canted position of the wing rollers imposes a detraining effect upon the conveying reach.

According to the present invention the troughing roller assembly is arranged for movement as a unit in a plane perpendicular to the longitudinal axis of the rope strands, and is secured by brackets at spaced points along the support strand so that the pendent effect in a vertical plane is minimized. Moreover, the outer wing rollers of the assembly, which are generally flexibly operatively interconnected to at least one intermediate roller, are arranged to have their outer ends shift slightly in the direction of belt movement with respect to their inner ends, thereby to impose a corrective force component upon the conveying reach to correct for misalignment thereof.

One of the principal objects of the invention is to provide an improved troughing roller assembly for a belt conveyor, said assembly being characterized by the ability to improve the alignment of the conveying reach, whether the conveyor be operated on level terrain or downhill.

Another object is to provide a troughing roller assembly capable of freely articulating in a vertical direction in accordance with the load thereon, yet capable of having its wing rollers shift in directions corrective of belt misalignment.

Other objects and important features of the invention will be apparent from a study of the specification following taken with the drawings which together describe and illustrate a number of preferred embodiments of the invention and what are now considered to be the best modes of practicing the principles thereof.

Other embodiments may be suggested to those having the benefit of the teachings herein and such other embodiments are intended to be reserved especially as they fall within the scope and purview of the subjoined claims.

Figure 5:
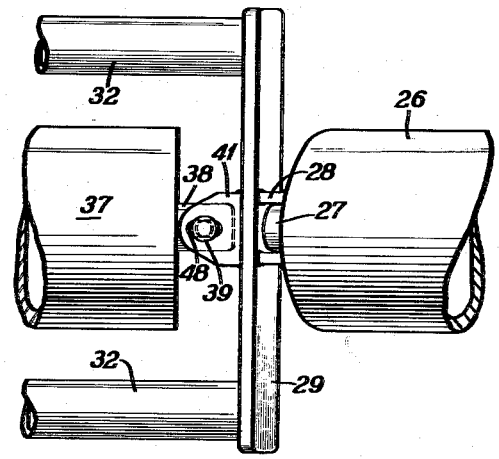

In the drawings:
FIGURE 1 is an elevational view of an improved troughing roller assembly according to one embodiment of the present invention;
FIGURE 2 is a top plan view with parts omitted of a portion of the troughing roller assembly of FIGURE 1 taken substantially along the lines 2—2 of FIGURE 1;
FIGURE 3 is a top plan view, to an enlarged scale, of a portion of FIGURE 2;
FIGURE 4 is an end elevational view, to an enlarged scale, looking in the direction of the arrows 4—4 of FIGURE 2; and FIGURE 5 is a detail top plan view, to an enlarged scale, showing a portion of the improved troughing roller assembly according to another embodiment of the invention.

Referring now particularly to FIGURE 1 of the drawings, the improved troughing roller assembly according to the present invention is indicated generally by the reference numeral 10, and is adapted to be suspended between a pair of laterally spaced support strands or wire ropes 11, which in turn are supported at intervals throughout their length upon standards indicated generally by the reference numeral 12. Each such standard includes a pair of laterally spaced feet 13 resting upon a mine floor F, each of the feet having a tubular socket 14 extending upward therefrom into which an adjustable post or column 16 is fitted. The upper end of the adjustable post 16 is provided with a U-shaped saddle 17 for the rope strand 11. The position of the adjustable posts 16 in their sockets 14 may be adjusted by means, not shown, so that the saddles 17 are in a common horizontal plane.

The troughing roller assembly 10 is arranged to support the load upon the conveying reach 18 of an endless belt. A return reach 19 is supported upon a return idler roller 21 turning upon a shaft 22. The shaft is supported at its ends in brackets 23 extending upward from a strut member 24 which maintains tubular sockets 14 and their telescoping posts 16 in properly spaced relationship.

The troughing roller assembly 10 includes a center load supporting roller 26 turning upon an idler shaft 27, see also FIGURE 2. The shaft 27 is pivotally connected to a clevis or pair of links 28 extending from a transverse frame member 29, pins 31 being provided and passing through the links 28 and the shaft 27 to complete the pivotal connection.

Frame means for transmitting load on the center roller directly to the flexible strands along a tension path bypassing the wing rollers includes frame members 32, extending laterally from each end of the transverse frame members 29, and U-shaped connectors or brackets 33 to which the outer ends of the frame members are welded. The limbs of connectors 33 embrace the strands. As seen in FIGURE 2, the brackets 33 extend along the rope strands 11 and are secured thereto by clamping pins or spikes 34 passing through aligned apertures 36 in the upper and lower limbs thereof.

Inclined wing or troughing rollers 37 flank the center or intermediate roller 26. The wing rollers are supported within the two spaced frame members 32, and turn upon idler shafts 38, the inner ends of which are pivotally connected at 39 between the arms of a clevis 41 extending from the transverse frame members 29. The outer ends of the shafts 38 are pivotally connected to pairs of links 42, there being pin connections 43 thereto. The other ends of the links 42 embrace a lower limb 44 of the U-shape brackets 33 which supports the outer ends of the wing rollers. A pin 46, extending across an elongated slot 47, connects the links 42 into the limb 44.

From the description thus far it will be seen that the troughing roller assembly 10 is free to move in a vertical plane by reason of the pivotal connections at 31, and by reason of the resiliency of the rope strands 11 to which the brackets 33 are connected. However, the length of the brackets 33 along the strands 11 and the frame members 32 extending therefrom are such as to maintain the center roller substantially stationary with respect to the strands and to prevent a pendulum-like movement of the troughing roller assembly in directions along the longitudinal axis of the conveying reach 18. At the same time, movement in a plane perpendicular to the axis of the rope strands is constrained. The prevention of such pendulum-like action is particularly important where the conveyor is running downhill, which would normally cause the wing rollers 37 to be canted a slight amount at its outer end in an "upstream" direction, which would tend to detrain the conveying reach 18.

The link and slot connection 42, 46, 47 at the outer ends of the troughing rollers 37 to the limbs 44 of the brackets 33 enables the outer ends of rollers 37 to shift or swing in a "downstream" direction, so that upon misalignment of the conveying reach 18 a corrective component of force will be exerted thereon tending to realign the conveying reach. The elongated slots 47 enable the wing rollers 37 to move past a centered position and to adopt a position past center to give the corrective position to the wing rollers 37.

Referring now to FIGURE 5 of the drawings, there is shown an alternate embodiment where the connection of the inner end of the shaft 38 to the clevis 41 is enabled to have a certain amount of endwise movement to accommodate the canting movement of the rollers 37. The pin 39 at such connection is free to move with the shaft 38 in an elongated slot 48 at the clevis 41. In such alternate embodiment of the invention the connection of the links 42 to the arm 44 is a swiveling one only, and there is no endwise movement at the pin 46. In other words, the "toggling" effect of the wing roller 37 is provided by the connection at the inner end of the wing roller 37 instead of at the outer end, as seen in FIGURES 2 and 3.

In the embodiment seen with respect to FIGURE 5 the outer end of the wing roller 37 can shift in a "downstream" direction to provide the corrective force component as previously described.

This application is a continuation application of applicant's prior co-pending application, Serial Number 704,483, filed December 23, 1957, now abandoned.

While the invention has been described in terms of a number of embodiments thereof, its scope is intended to be limited only by the claims here appended.

I claim:
1. A two directional training roller assembly for supporting and automatically training the conveying reach of a conveyor belt in a flexible strand conveyor of the type in which at least a pair of flexible strands are trained in generally parallel relationship to one another along a conveying course, said training roller assembly including, in combination,
   at least one intermediate load carrying roller,
   at least a pair of wing rollers flanking the intermediate roller, and
   means for bypassing the load carried by the intermediate roller around the wing rollers to thereby enable the wing rollers to swing to a belt training position, said bypassing means including
   a pair of rigid frame structures for supporting and maintaining the intermediate roller generally transverse to the direction of belt travel at all times and substantially stationary with respect to the conveyor strands independently of the direction of belt travel and independently of the amount of load on the assembly, and for transmitting load from the intermediate roller around the wing rollers to the strands,
   a pair of strand connectors, each strand connector being engageable with an associated strand and secured to a frame structure to thereby prevent relative movement between the strand, connector, and rigid frame structure,
   each rigid frame structure including an inner frame member and means for connecting the end of an adjacent intermediate roller thereto for flexing movement in a generally vertical plane,
   and an outer frame member, said outer frame member carrying a strand connector,
   at least one elongated substantially transversely positioned frame member for each rigid frame structure, said transversely positioned frame member being rigidly secured at its inner end to the inner frame member, and at its outer end to the outer frame member,
   to thereby provide a rigid tension bypass path from the intermediate roller, through the connecting means, and around the wing roller via the rigid frame structure,
   a pivot for connecting the inner end of each wing roller to an associated inner frame member which enables the wing roller to move in a plane generally parallel to the plane of the belt passing thereover,
   the means connecting the end of the intermediate roller adjacent its associated inner frame member being independent of the pivot connecting the inner end of the wing roller to its associated inner frame member,
   and means for connecting the outer end of each wing roller to the outer frame member which enables the outer end of the wing roller to move downstream with respect to the direction of belt travel so as to exert a training effect on the belt.

2. The two directional training roller assembly of claim 1 further characterized in that the means for connecting the outer end of each wing roller to its associated outer frame member is a link,
   the outer pivot of each link being movable in a direction generally parallel to the longitudinal axis of the intermediate roller.

3. The two directional training roller assembly of claim 1 further characterized in that the means for connecting the outer end of each wing roller to its associated outer frame member is a link, and
   the pivot which connects the inner end of each wing roller to its associated inner frame member is movable in a direction generally parallel to the longitudinal axis of the intermediate roller.

References Cited in the file of this patent
UNITED STATES PATENTS

| | | |
|---|---|---|
| 2,773,257 | Craggs et al. | Dec. 4, 1956 |
| 2,868,355 | McCann | Jan. 13, 1959 |
| 2,875,886 | Lo Presti et al. | Mar. 3, 1959 |
| 2,880,851 | Salmons | Apr. 7, 1959 |
| 2,889,918 | Bergmann | June 9, 1959 |